United States Patent [19]
Marty et al.

[11] Patent Number: 4,562,960
[45] Date of Patent: Jan. 7, 1986

[54] PRESSURE RESPONSIVE AERATOR

[75] Inventors: Garry R. Marty, Holly; Dennis W. Crawford, Pontiac; Trevor M. Wingfield, Davisburg, all of Mich.

[73] Assignee: Masco Corporation of Indiana, Taylor, Mich.

[21] Appl. No.: 474,807

[22] Filed: Mar. 14, 1983

[51] Int. Cl.$^4$ .............................................. E03C 1/084
[52] U.S. Cl. ....................................... 239/72; 138/45; 239/106; 239/428.5; 239/570
[58] Field of Search ...................... 239/428.5, 106, 107, 239/533.1, 533.13, DIG. 18, 72, 570, 460; 138/45; 261/DIG. 22

[56] References Cited
U.S. PATENT DOCUMENTS

| | | | |
|---|---|---|---|
| 2,914,084 | 11/1959 | McLean et al. | 239/533.13 |
| 2,954,936 | 10/1960 | Shames et al. | 239/428.5 |
| 3,104,819 | 9/1963 | Aghnides | 239/533.13 |
| 3,570,447 | 3/1971 | Basseches | 239/72 |
| 3,970,105 | 7/1976 | Pelton et al. | 138/45 |
| 4,000,857 | 1/1977 | Moen | 239/428.5 |
| 4,075,294 | 2/1978 | Saito et al. | 138/45 |
| 4,082,225 | 4/1978 | Haynes | 239/428.5 |
| 4,437,493 | 3/1984 | Okuda et al. | 138/45 |

FOREIGN PATENT DOCUMENTS 2541093  3/1977  Fed. Rep. of Germany ..................... 239/533.13

*Primary Examiner*—Jeffrey V. Nase
*Assistant Examiner*—Michael J. Forman
*Attorney, Agent, or Firm*—Steven L. Permut; Malcolm L. Sutherland; Leon E. Redman

[57] ABSTRACT

'An aerator has a pressure responsive valve assembly therein for restricting the flow therethrough when the pressure of the water supply is increased. The aerator includes a housing mounting a stream straightener member and a partition member. The partition member seats an annular O-ring which in turn seats a movable valve element. The valve element and partition define an assembly with a variable sized passageway. The valve element is responsive to pressure from the pressure source to compress and move the O-ring to constringe the passageway. A mixing body is movably mounted between the stream straightener and the partition member for mixing water from the passageway with air. The valve element has a depending leg which is manually operable from the outlet of the housing. The leg can be pressed upwardly to lift the valve element which opens up the passageway thereby creating turbulence in the aerator. The turbulence vibrates the mixing body which can be audibly detected to indicate that the aerator is being flushed and cleaned.

3 Claims, 8 Drawing Figures

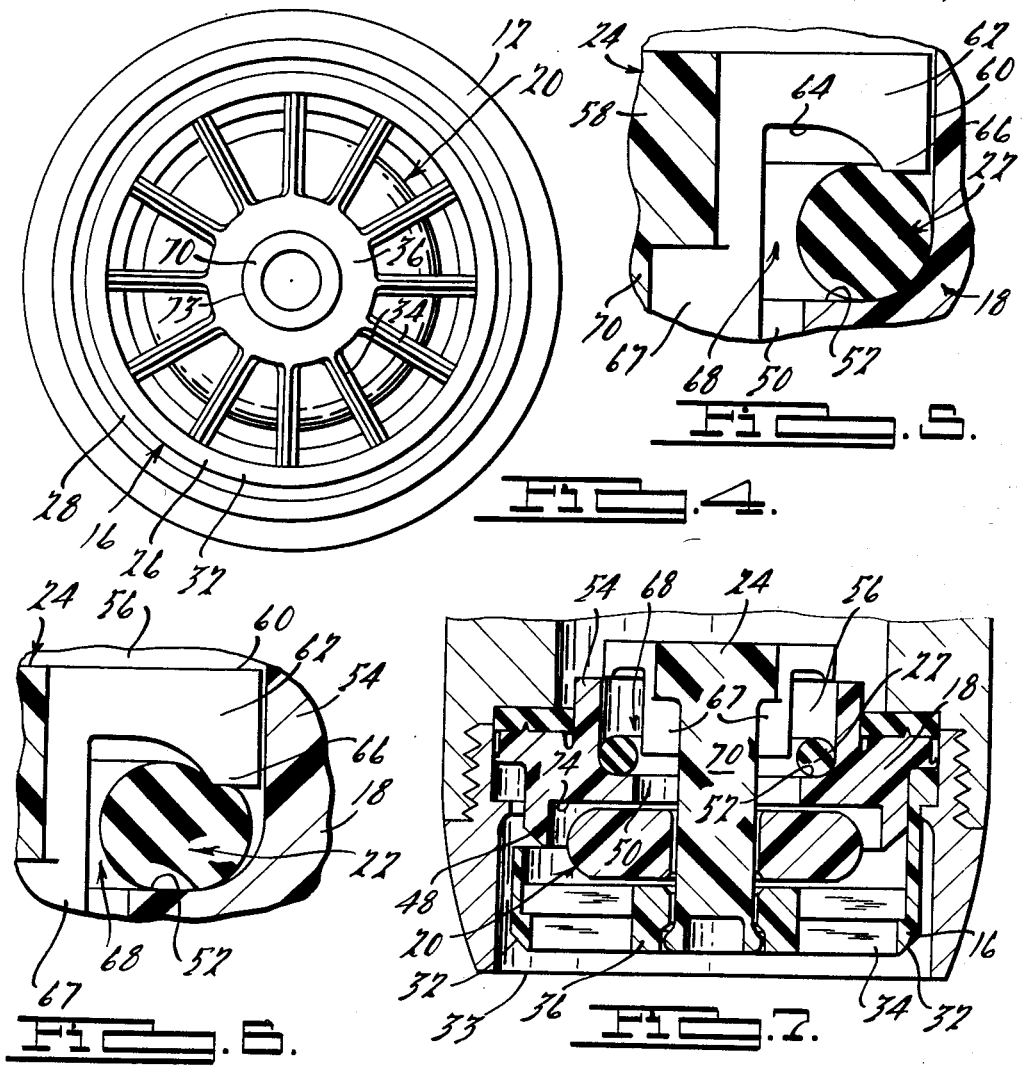

4,562,960

PRESSURE RESPONSIVE AERATOR

TECHNICAL FIELD

This invention relates to aerators and more particularly to pressure responsive aerators for use in water faucets.

BACKGROUND OF THE INVENTION

Aerators for mixing water and air are desired to produce a bubbly coherent stream. In addition, aerators have been made which restrict the water flow from a high pressure water supply. A disc with a restricting orifice is placed upstream from the screen. However, these aerators do not take into account the undesireable restriction of the stream at lower water pressure. In other words, these aerators overly restrict the flow from a low pressure water supply.

It is common to have an aerator housing containing a disc with small apertures therethrough. The apertures direct water to flow onto a mixing body. The aerator housing also incorporates an air passage which allows air to enter the aerator and mix with the water that lands on the mixing body. Screens are often mounted below the mixing body and the stream of water passes therethrough.

Attempts have been made to have the screened aerator respond to the pressure of the water supply. An O-ring seated over an opening upstream of the screen can be compressed to increase the restriction at high pressures. However, the screen in these aerators traps water thereon when the faucet is turned off. Evaporation of the water leaves mineral deposits on the screen which over a period of time eventually clogs the screen and deteriorates the water flow therethrough. Secondly, cleaning the screen requires disassembly of the aerator. Thirdly, if the faucet is attached to a low pressure water supply, the screen may undesireably restrict water flow therethrough.

An aerator which responds to pressure in the water supply and yet is able to maximize the water flow therethrough at low water pressure is desireable. It is also desireable to have an aerator that reduces the necessity of cleaning and, when cleaning is necessary, can be cleaned with a minimum amount of effort. It is also desireable to have an audible indication when the aerator is being cleaned.

SUMMARY OF THE INVENTION

According to the invention, a pressure responsive aerator for a water faucet has a housing, an inlet, and an outlet. A stream straightener is mounted in proximity to the outlet end of the housing. A partition member is seated upstream of the stream straightener. The partition member has a central aperture therethrough and an annular shoulder thereabout forming a seat for an elastomeric O-ring.

A movable valve element is seated on the O-ring. The valve element has passageways therethrough in fluid communication to the central aperture. The passageways are partially restricted by the elastomeric O-ring. Upon an increase in water pressure, the valve element moves downstream against the bias of the O-ring. The O-ring is moved to constringe the passageways. The movable valve element has a depending leg slidably received in a retaining portion of the stream straightener and is interlocked therewith to prevent disengagement of the moveable valve member.

Interposed between the stream straightener and the partition member is an annular mixing body which is slideably mounted on the leg. The mixing body normally provides a surface for water to mix thereon with air entering through passages between the partition member and stream straightener.

In addition, when the leg is pushed upstream, water flushes through the raised valve element at an increased rate causing the mixing body to rapidly vibrate. The rapid vibration of the mixing body produces a grinding noise to indicate that the valve is in a raised position and the aerator is being cleaned by the rapid flushing of water therethrough.

In broader terms, one aspect of the invention relates to a pressure responsive aerator having a partition member seating a movable valve element. The partition and valve element define an assembly with a passageway therethrough. The valve element is biased upstream to a first position. The valve element is movable against the bias to a second position in response to an increase in pressure from a water supply such that the passageway between the valve element and the partition is constringed thereby creating a greater restriction for fluid to pass therethrough.

Another aspect of the invention relates to a valve element which is manually operable from the outlet of the aerator to provide a flushing action of water through the valve element.

Another aspect of the invention relates to a mixing body which is slideably mounted within the aerator to mix water with the air when a valve element is in a normal operating position.

Another aspect of the invention relates to a pressure responsive valve having a stationary element, movable element and a resilient O-ring interposed therebetween. The movable and stationary element define a passage through the valve. The movable element is pressure responsive to pressure of a water supply to impinge the O-ring and causing the O-ring to constringe the passage.

BRIEF DESCRIPTION OF THE DRAWING

The invention will now be described in reference to the accompanying drawings in which:

FIG. 4 is a bottom plan view of the aerator shown in FIG. 1;

FIG. 5 is an enlarged fragmentary side elevational and segmented view illustrating the pressure responsive valve element, O-ring, and partition member;

FIG. 6 is a view similar to FIG. 5 showing the valve element responding to high pressure from the water supply;

FIG. 7 is a side elevational and segmented view of the aerator in its cleaning mode.

FIG. 8 is a chart illustrating the flow rate as a function of water pressure for various aerators;

DETAILED DESCRIPTION OF THE PREFERRED EMBODIMENT

Figure 1:
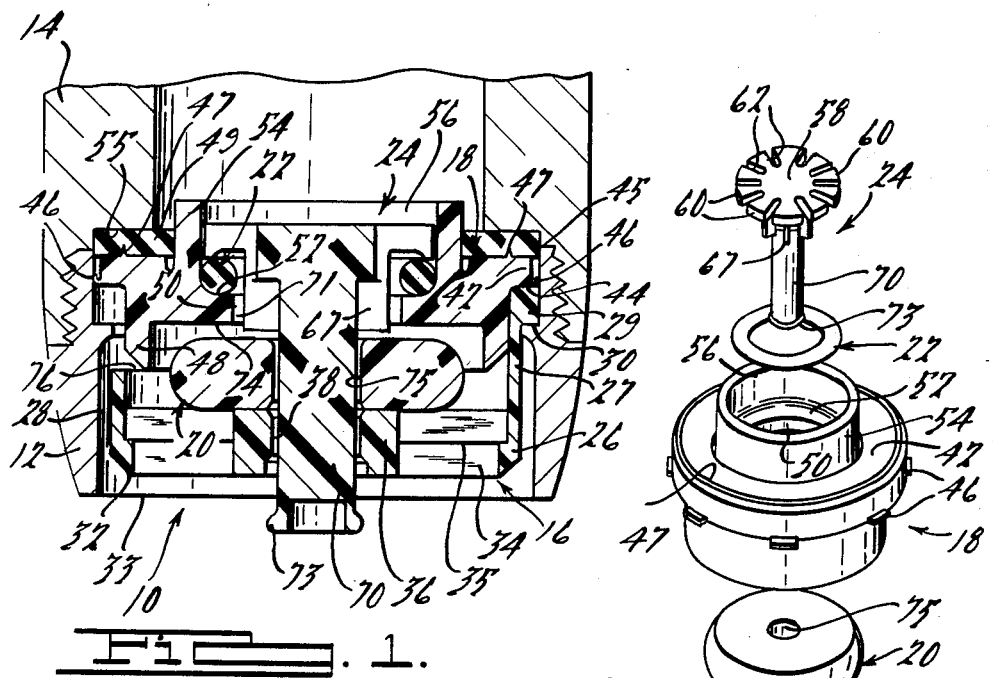
FIG. 1 is a side elevational and segmented view of an aerator according to the invention attached to a faucet spout.

Referring particularly to FIG. 1, an aerator 10 has a housing 12 threaded to a water faucet spout 14. The housing 12 contains a stream straightener 16, a partition member 18, a mixing body 20, an elastomeric O-ring 22, and a valve element 24.

Figure 2:
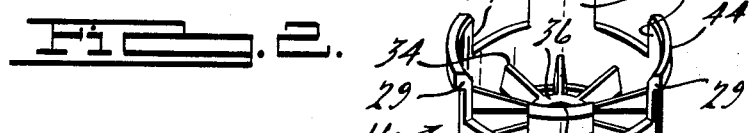
FIG. 2 is a perspective exploded view illustrating the separate components of the aerator shown in FIG. 1.

The stream straightener 16 as shown in FIGS. 1, 2 and 4 has a generally annular shaped ring portion 26 positioned near the outlet 33 of the housing 12. The ring portion 26 is sized to form an annular air passage 28 between itself and the housing 12. The ring portion 26 is integral with upwardly extending flanges 27. Each flange 27 has an outwardly extending shoulder 29 that sits on an inwardly extending annular ledge 30 integral with the housing 12. The annular shaped ring portion 26 has a beveled lower edge 32. A plurality of vanes 34 have their radial outer ends integral with ring portion 26 and their radio inner ends integral with an annular seat 36. Each vane 34 is tapered from a midsection 35 and has a vertical attitude. The tapered vanes 34 and the beveled edge 32 promote a straight collimated stream of water through the stream straightener 16. The annular seat 36 defines a central aperture 38 therethrough.

Figure 3:
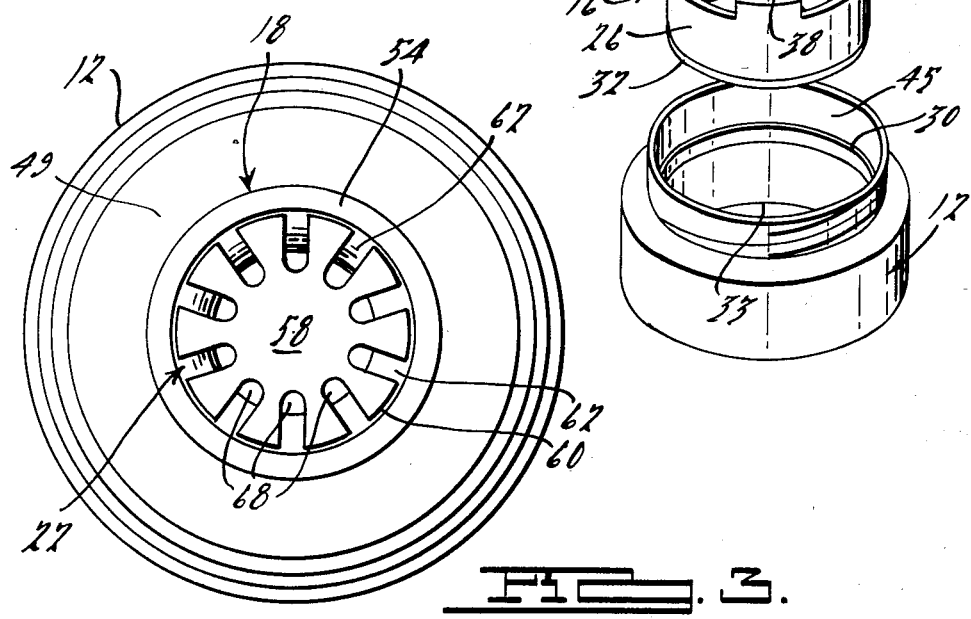
FIG. 3 is a top plan view of the aerator shown in FIG. 1.

The partition member 18, as shown in FIGS. 1, 2, and 3, has a radially outward extending shoulder 42 seated on the upper ends 44 of the flanges 27. The shoulder 42 has small flexible tabs 46 which outwardly extend from the shoulder 42 to provide an interlocking press fit with respect to the housing 12 near the inlet 45 thereof. The shoulder 42 also has a raised annular rim 47 to provide a leakproof connection with respect to the water faucet spout 14. The annular rim 47 is pressed against an annular seal 49 when the housing 12 is threaded onto spout 14. A shoulder 55 in the faucet spout 14 sealingly abuts the upper surface of seal 49.

In addition, the partition member 18 has a depending annular portion 48. The annular portion 48 is seated between the circumferentially spaced flanges 27 to centrally position the partition member 18 above the stream straightener 16. The partition member 48 has a central opening 50 and an annular ledge 52 thereabout which seats the O-ring 22. A cylindrical upper wall 54 circumscribes the annular ledge 52 and extends upwardly therefrom and defines a central bore 56 in communication with opening 50.

The valve element 24 has a disc portion 58 sized to slideably move within the bore 56. The disc portion 58 has a plurality of peripheral radially extending flanges 60 with notches 62 interposed between as shown in FIG. 3. Each flange 60 as shown in FIG. 5 has a recessed wall 64 and a depending protuberance 66 at a radially outer end thereof. The disc portion 58 rests on the O-ring 22 which in turn rests on the annular ledge 52 of the partition member 18. The O-ring 22 and valve element form a variable sized passageway therebetween generally indicated as 68.

The disc portion 58 has a downwardly depending leg 70. The leg 70 has a plurality of ribs 67 positioned below flanges 60. The leg 70 passes through the central aperture 50 in the partition 18 to form an annular clearance 71 and extends through aperture 38 in the stream straightener 16. The lower end of the leg has an annular rim 73 to interlock the leg 70 to the stream straightener 16. The valve member 24 and the stream straightener 16 are made from a plastic material to allow deformation and provide a snap fit interlocking connection between the two members.

Interposed between the stream straightener 16 and the partition member 18 is the annular mixing body 20 having a central aperture 75 which slideably receives the leg 70. The mixing body 20 is normally seated on the seat portion 36 and vanes 34. The mixing body is sized such that it can move upwardly from the seat portion 36 and vanes 34 and abut the lower surface 74 of the partition member 18.

Normally, the valve member 24 is in a position shown in FIGS. 1 and 5 when no water or low pressurized water is passing through the aerator. Water passes through the central bore 56 through the variable sized passageways 68 and down through the central opening 50 where the water hits the mixing body 20 and is radiated outwardly until it hits the depending portion 48 where it is directed downwardly. Simultaneously, air is drawn up through the annular air passage 20 and through a gap 76 formed between the depending portion 48 and the stream straightener 16. The aerated water is then collimated downwardly by the vanes 34 and ring portion 26.

Upon an increase in water pressure, the disc portion is pressed downstream against the resilient bias of the O-ring 22. The depending protuberances 66 then are pressed against the O-ring 22. In response, the O-ring is compressed and rolled radially inwardly as shown in FIG. 6. The new position of the O-ring constringes the passageway 68 thereby providing a greater restriction. Hence, the ratio of the flow rate with respect to the water pressure is decreased and the flow rate levels off at higher pressures.

Referring to FIG. 8, flow rates of various aerators are compared within a range of water pressures. Line 80 indicates the flow rate of a non-restrictive conventional aerator. In areas where there is only a low water pressure, the flow rate is desirably high. However, if the aerator is used where there is a high water pressure, the aerator has a maximum flow rate which is excessive and can result in wasted water.

Line 82 indicates the flow rate of a conventional aerator with a restricting orifice upstream therefrom. As shown, the restrictive orifice provides an adequate flow when there is a high pressure source above 40 p.s.i. However, if the restricting orifice is used when the water supply has a low pressure below 40 p.s.i., an inadequate maximum flow rate results.

Lines 84 and 86 disclose the flow rate of aerator 10 in accordance with the invention when two different O-rings having two different durometers are positioned therein. Line 84 is a result of an O-ring having a 70 durometer. As shown in the chart, at low pressures the low rate is comparable to a conventional nonrestricted aerator. The graph at first goes up at a relatively fast rate and then levels off when the pressure is between 30–40 p.s.i. At higher pressures, the flow rate barely increases to provide a measured maximum flow rate of about 2.5 gallons per minute at 80 p.s.i.

Line 86 is a result of an O-ring having an 80 durometer reading. At low pressures, the flow rate is comparable with the flow rate of the 70 durometer O-ring aerator. At high pressures the flow rate is increased to a maximum of 3.0 gallons per minute at 80 p.s.i. Therefore, O-rings of different durometers can be installed in the pressure responsive valve 21 for obtaining differently desired maximum flow rates.

In addition, an aerator can be marketed and used unchanged in different geographic areas regardless of the pressure of the local water supply. The same aerator can be marketed in an area of low water pressure as well as an area of high water pressure while maintaining the near optimum maximum flow rate in either area.

In addition to providing optimum flow rates, the aerator 10 requires minimal maintenance, There is no screen which restricts the water flow. Consequently, there is no screen which may have deposits formed thereon and plug up the aerator. The aerator 10 hence, is relatively free from deposit buildup and has a reduced need to be cleaned.

If deposit buildup occurs within the aerator 10 and cleaning becomes necessary, the aerator can be easily cleaned without disassembly. While a high pressure water supply is turned on, leg 70 can be operably pushed up as shown in FIG. 7 such that the disc portion 58 is lifted out of bore 56 and the passageways 68 become greatly increased in size. The flow rate through aperture 50 is thereby greatly increased to provide a flushing action through the aerator 10. Ribs 67 prevent the O-ring from being displaced off of ledge 52 and into aperture 50.

Furthermore, the increased flow rate through the aerator provides sufficient turbulence to vibrate the mixing body 20 off seat 36 and vanes 34. The rapid vibration between seat 36 and lower wall 51 of partition member 18 makes an audible grinding noise which indicates the aerator 10 is in the cleaning mode. Release of leg 70 automatically returns the aerator 10 to its normal mode. The aerator can thus be cleaned with a minimum of effort. A mere pushing up on leg 70 is required. No disassembly is needed.

Variations and modifications of the present embodiment can be made without departing from the spirit and the scope of the invention as defined in the appended claims.

The embodiments in which an exclusive property or privilege is claimed are defined as follows:

1. An aerator device characterized by:
    a housing having an inlet and outlet;
    seat means in said housing for seating a movable valve element and having a passage for allowing fluid to pass by said valve element;
    said valve element including a downwardly depending leg;
    said leg extending downstream and having a downstream end being engageable from said outlet whereby upon a manually exerted upward force, said leg lifts said valve element upward against the pressure of a fluid supply to provide for increased flow by said valve element;
    air passage means for introducing air into said fluid flowing by said valve element;
    a mixing body being slidably mounted for axial movement along said leg below said seat means such that fluid passes through said passage and mixes with said air upon impinging on said mixing body when said valve element is in a normal position and vibrates up and down on said leg to produce an audible noise when said leg and valve element are in a raised position and said increased flow occurs.

2. An aerator as defined in claim 1 further characterized by:
    said valve element includes a disc shaped portion;
    said seat means including a resiliently flexible ring being positioned under and said disc portion about said downwardly extending leg;
    said passage extending centrally through said seat means with said leg extending downwardly through said passage;
    said leg has a plurality of ribs extending radially therefrom such that said ribs prevent said resilient flexible ring from permanently disengaging from said seat means when said disc and leg are in the raised position.

3. An aerator device as defined in claim 2 further characterized by:
    said disc portion has outer peripheral protuberances that engage an outer portion of said resilient ring such that upon movement of said valve element toward said seat means, said protuberances direct said ring radially inward to constringe said passage.

* * * * *